(12) United States Patent
Koyama et al.

(10) Patent No.: US 7,450,776 B2
(45) Date of Patent: Nov. 11, 2008

(54) GRADATION ATTRIBUTES CONTROL ACCORDING TO CHARACTERISTICS OF IMAGE

(75) Inventors: Fumio Koyama, Shiojiri (JP); Yasuo Yagi, Kawasaki (JP)

(73) Assignee: Seiko Epson Corporation, Tokyo (JP)

( * ) Notice: Subject to any disclaimer, the term of this patent is extended or adjusted under 35 U.S.C. 154(b) by 510 days.

(21) Appl. No.: 11/171,233

(22) Filed: Jul. 1, 2005

(65) Prior Publication Data

US 2006/0007511 A1   Jan. 12, 2006

(30) Foreign Application Priority Data

Jul. 9, 2004   (JP)   ............... 2004-202508

(51) Int. Cl.
*G06K 9/40* (2006.01)
*G03F 3/08* (2006.01)

(52) U.S. Cl. ...................... 382/274; 358/521

(58) Field of Classification Search ............... 382/167, 382/274, 312, 275; 358/521, 589, 522; 345/204, 345/427, 604
See application file for complete search history.

(56) References Cited

U.S. PATENT DOCUMENTS

| | | | | |
|---|---|---|---|---|
| 6,151,410 | A * | 11/2000 | Kuwata et al. | ............... 382/167 |
| 6,664,973 | B1 * | 12/2003 | Iwamoto et al. | ............... 345/589 |
| 6,958,760 | B1 * | 10/2005 | Kim | ............... 345/697 |
| 2004/0184671 | A1 * | 9/2004 | Fukuda et al. | ............... 382/274 |
| 2004/0246242 | A1 * | 12/2004 | Sasaki | ............... 345/204 |

FOREIGN PATENT DOCUMENTS

| | | |
|---|---|---|
| JP | A 5-224641 | 9/1993 |
| JP | A 10-248024 | 9/1998 |
| JP | A-2001-296855 | 10/2001 |
| JP | A 2002-359754 | 12/2002 |
| JP | A 2003-46807 | 2/2003 |
| JP | A 2003-110878 | 4/2003 |
| JP | A 2003-259154 | 9/2003 |
| JP | A-2003-298877 | 10/2003 |
| JP | A 2003-298974 | 10/2003 |
| JP | A 2003-337580 | 11/2003 |
| JP | A-2004-140702 | 5/2004 |

* cited by examiner

*Primary Examiner*—Kanji Patel
(74) *Attorney, Agent, or Firm*—Oliff & Berridge PLC (57) ABSTRACT

A gradation attributes correcting device to correct gradation attributes of an input image signal includes a brightness gradation correcting unit to correct gradation attributes with respect to brightness of an image indicated by the input image signal. The brightness gradation correcting unit includes a characteristic information acquisition unit, a correction information decision unit, and a brightness gradation processing unit. The characteristic information acquisition unit acquires a minimum, average, and maximum brightness, of an image on a frame from the input image signal. The correction information decision unit determines correction information to correct the gradation attributes with respect to brightness according to combinations of the acquired minimum, average and maximum brightness of the image on the frame. The brightness gradation correction processing unit establishes a polynomial function for the image on the frame based on the correction information to correct the gradation attributes by arithmetic operation using the polynomial function.

8 Claims, 8 Drawing Sheets

| | MINIMUM BRIGHTNESS Bp (0~1023) | AVERAGE BRIGHTNESS APL (0~1023) | MAXIMUM BRIGHTNESS Wp (0~1023) | Gn | Off | Vi_Sp1 | Vi_Sp2 | Vi_Sp3 | dVo_Sp1 | dVo_Sp2 | dVo_Sp3 |
|---|---|---|---|---|---|---|---|---|---|---|---|
| K | 0 | 0 | 0 | 1 | 0 | 200 | 500 | 700 | 300 | 500 | 500 |
| L | 0 | 0 | 1023 | 1 | 0 | 200 | 500 | 700 | 150 | 300 | 250 |
| M | 0 | 1023 | 1023 | 1 | 0 | 200 | 500 | 700 | -200 | -300 | -200 |
| N | 1023 | 1023 | 1023 | 1 | 0 | 200 | 500 | 700 | -300 | -500 | -500 |

GRADATION ATTRIBUTES CONTROL ACCORDING TO CHARACTERISTICS OF IMAGE

This application claims the benefit of Japanese Patent Application No. 2004-202508, filed Jul. 9, 2004. The entire disclosure of the prior application is hereby incorporated by reference herein in its entirety.

BACKGROUND

The exemplary embodiments relate to a technique for varying gradation attributes of an image signal in accordance with characteristics of a displayed image.

In a related art image display system, input-output attributes indicating variations in brightness of displayed images with respect to image signals representing input images (input image signals) are controlled to obtain a desired image quality of the displayed images. In a related art method to control the input-output attributes, characteristics of the input images are detected to dynamically vary gradation attributes of brightness signals constituting the input image signals in accordance with the detected characteristics of the input images. (For example, see: Japanese Patent Application Publication No. 2003-110878; Japanese Patent Application Publication No. 2003-337580; Japanese Patent Application Publication No. 2003-259154; Japanese Patent Application Publication No. 2003-298974; Japanese Patent Application Publication No. 2003-46807; Japanese Patent Application Publication No. 2002-359754; and Japanese Patent Application Publication No. 10-248024).

According to the related art method, the gradation attributes are varied in accordance with the maximum brightness, the minimum brightness, the average brightness, the brightness histogram, and the like, in the brightness signals constituting an input image on one frame. Since attributes of high gradation are controlled according to the maximum brightness, and attributes of low gradation are controlled according to the minimum brightness, the minimum brightness is not reflected in the control of high gradation, and the maximum brightness is not reflected in the control of low gradation. Realistically, however, the brightness of high gradation affects the attributes of low gradation and the brightness of low gradation affects the attributes of high gradation. Thus, the related-art method is insufficient to appropriately control gradation attributes in accordance with the characteristics of input images.

SUMMARY

Accordingly, it is an advantage of the exemplary embodiments to provide a technique to appropriately control gradation attributes with respect to brightness of an image to be displayed, according to the characteristics of the image.

A device according to an aspect of the exemplary embodiments is a gradation attributes correcting device to correct gradation attributes of an input image signal. The gradation attributes correcting device includes a brightness gradation correcting unit to correct gradation attributes with respect to brightness of an image indicated by the input image signal. The brightness gradation correcting unit has a characteristic information acquisition unit to acquire on as the minimum brightness, average brightness and maximum brightness of an image on a frame from the input image signal. The brightness gradation correcting unit further has a correction information decision unit to determine correction information to correct the gradation attributes with respect to brightness according to combinations of the acquired minimum brightness, average brightness, and maximum brightness of the image on the frame. The brightness gradation correcting unit further has a brightness gradation correction processing unit to establish a polynomial function for the image on the frame based on the correction information to correct the gradation attributes with respect to brightness by arithmetic operation using the polynomial function.

In the gradation attributes correcting device according to the above aspect of the exemplary embodiments, correction information to correct gradation attributes with respect to brightness is determined for an image on the frame in accordance with combinations of the acquired minimum brightness, average brightness and maximum brightness. Then, a polynomial function is established based on the determined correction information, and the gradation attributes with respect to brightness are corrected by arithmetic operation using the established polynomial function. Accordingly, gradation attributes with respect to brightness of an image can be more appropriately controlled than in a related-art technique, and thus image quality can be enhanced or improved.

In an exemplary embodiment, the polynomial function is a spline function so that gradation attributes with respect to brightness can be represented by a smooth curve. When a boundary at which corrected gradation attributes vary, and gradation attributes become non-continuous at the boundary, for example, deterioration of image quality may be caused. However, gradation attributes with respect to brightness are expressed as a smooth curve when the spline function is used, as in the above exemplary embodiment, which prevents or reduces deterioration of image quality due to non-continuous gradation attributes.

In an exemplary embodiment, correction information at least includes information on a correction reference line as a reference for the correction of the gradation attributes with respect to brightness, and information on a correction curve as a result of corrected gradation attributes with respect to brightness. The information on the correction curve includes a plurality of curve set positions on the correction curve and respective displacement from the correction reference line at the plural curve set positions. In this case, the polynomial function can be easily established.

In an exemplary embodiment, the correction information decision unit includes a correction information table which shows correction information corresponding to the combinations of the minimum brightness, average brightness and maximum brightness in association with a plurality of the combinations thereof. The correction information decision unit determines correction information corresponding to the combinations of the acquired minimum brightness, average brightness and maximum brightness by referring to the correction information table. In this exemplary embodiment, the correction information in correspondence with the combinations of the acquired minimum brightness, average brightness, and maximum brightness can be easily determined.

In an exemplary embodiment, the correction information decision unit determines correction information corresponding to the combinations of the acquired minimum brightness, average brightness and maximum brightness by a predetermined interpolating arithmetic operation when the correction information corresponding to the combinations is not included in the correction information table. In this exemplary embodiment, the number of the combinations of the minimum brightness, average brightness and maximum brightness included in the correction information table can be reduced.

In an exemplary embodiment, the gradation attributes correcting device further includes a correction unit to correct nonlinear input-output attributes of an image signal outputted from the brightness gradation correcting unit, which attributes are inherent in a display device included in an image display system. In this exemplary embodiment, correction of the gradation attributes with respect to brightness in the brightness gradation correction can be separately performed from correction of gradation attributes to correct nonlinear input-output attributes of the display device included in the image display system. Thus, gradation attributes with respect to brightness can be easily corrected.

The above aspects of the exemplary embodiments have a broad application range, such as a gradation attributes correcting method and a device for the method, image processing apparatus including the gradation attributes correcting device, and an image display system including the image processing apparatus. Additionally, the above aspects of the exemplary embodiments are applicable in the form of a computer program to provide those methods and devices, a storage medium to store the computer program, data signals containing the computer program to be provided within carrier waves, and the like.

The "storage medium" according to the aspect of the exemplary embodiments involve a flexible disk, a CD-ROM, a magneto-optical disk, an IC card, a ROM cartridge, a punch card, a printed material on which symbols such as bar codes are printed, an internal storage system (memory such as RAM and ROM) and an external storage system of a computer, and other various media that a computer can read.

BRIEF DESCRIPTION OF THE DRAWINGS

The exemplary embodiments will be described with reference to the accompanying drawings, wherein like numbers refer to like elements, and wherein.

DETAILED DESCRIPTION OF EMBODIMENTS

Figure 1:
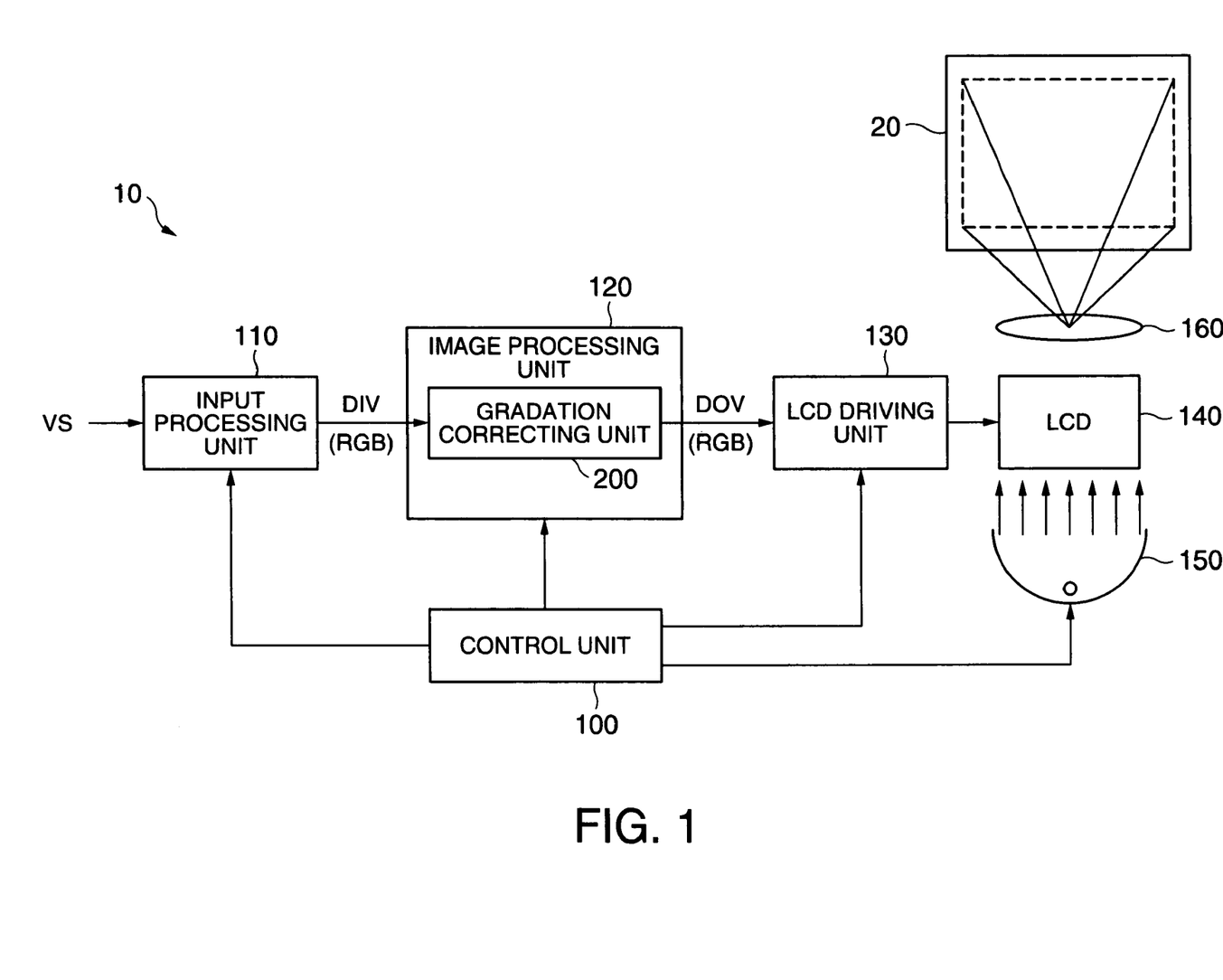
FIG. 1 is a schematic of an entire structure of an image display system according to the exemplary embodiments.

Exemplary embodiments according to the invention are described in the following order.
A. Entire Structure of Image Display System
B. Gradation Correcting Unit
  B1. Organization of Brightness Gradation Correcting Unit
    B1.1. RGB/YUV Conversion Unit
    B1.2. Characteristic Information Acquisition Unit
    B1.3. Correction Information Decision Unit
    B1.4. Gradation Correction Processing Unit
    B1.5. YUV/RGB Conversion Unit
  B2. Setting of Brightness Gradation Attributions
    B2.1 Function of Nonlinear Arithmetic Operation
    B2.2 Determination of Correction Parameters
    B2.3 Example Setting of Brightness Gradation Attributions
  B3. Advantages
C. Modifications
A. Entire Structure of Image Display System FIG. 1 is a schematic showing an entire structure of an image display system according to the exemplary embodiments. An image display system 10 includes a control unit 100, an input processing unit 110, an image processing unit 120 having a gradation correcting unit 200 as a gradation attribute correcting device of the exemplary embodiments, a liquid crystal panel (LCD) 140 as an image display unit, and a liquid crystal panel driving unit (LCD driving unit) 130. The image display system 10 may be a projector. The image display system 10 has an illumination optical system 150 to illuminate an area to be illuminated of the liquid crystal panel 140, and a projection optical system 160 to project image-indicating light (also referred to as "image light") emitted from the liquid crystal panel 140 on a screen 20.

The liquid crystal panel 140 modulates illumination light emitted from the illumination optical system 150 in accordance with driving signals sent from the liquid crystal panel driving unit 130 to emit modulated light (image light). The liquid crystal panel 140 has three liquid crystal panels for R (red), G (green) and B (blue) lights (not-shown). The illumination optical system 150 includes a light-color division optical system for dividing light into lights of three different colors. The projection optical system 160 includes a synthesization optical system for synthesizing the lights of the three different colors emitted from the liquid crystal panel 140. Since the structure of those optical systems included in the projector is described in detail in Japanese Patent Application Publication 10-171045, disclosed by the applicant of the exemplary embodiments and incorporated by reference in its entirety herein, for example, the explanation of the projector is herein omitted.

Alternatively, the liquid crystal panel 140 may have a single color liquid crystal panel. In the case of the liquid crystal panel 140 having a single color liquid crystal panel, the projection optical system 160 may be removed to provide a direct-viewing image display system.

The control unit 100 may be a computer system which includes a CPU, RAM, ROM, external storage system, communication system and other components (not-shown). The control unit 100 controls operations of respective blocks by the CPU which reads and executes programs and data stored in the ROM and the external storage system. The control unit 100 also provides various settings by supplying the data and the programs stored in the ROM and the external storage system for respective blocks included in the input processing unit 110, the image processing unit 120 and other areas.

The input processing unit 110 outputs an input image signal VS as a digital image signal DIV, which is allowed to be inputted to the image processing unit 120. When the input image signal VS is an analogue image signal, an image signal other than a synchronizing signal included in the input image signal VS (hereinafter also referred to as "image signal") is converted into a digital image signal. The image signal is converted by using an analogue-digital conversion function to be outputted as a digital image signal DIV. When the input image signal VS is a digital image signal, the conversion processing by the analogue-digital function is not performed. The type of the image signal used herein is a RGB signal type.

The image processing unit 120 temporarily writes image data indicated by the inputted digital image signal DIV to a not-shown memory based on a command from the control unit 100. The image processing unit 120 subsequently reads digital data stored in the memory and outputs the digital data as a digital image signal DOV. During the processes of writing to and reading from the memory, various image processing such as conversion of an image size (enlargement and contraction, image distortion correction, etc.), conversion into a format the liquid crystal panel driving unit 130 can process, correction of gradation attributes of a brightness signal by the gradation correcting unit 200 are performed.

The liquid crystal panel driving unit 130 produces a driving signal to drive the liquid crystal panel 140 in accordance with the inputted digital image signal DOV.

The liquid crystal panel 140 modulates illumination light emitted from the illumination optical system 150 in accordance with the driving signal. The modulated light (image light) is projected on the screen 20 as image light via the projection optical system 160. An image is thus displayed on the screen 20.

B. Gradation Correcting Unit

Figure 2:
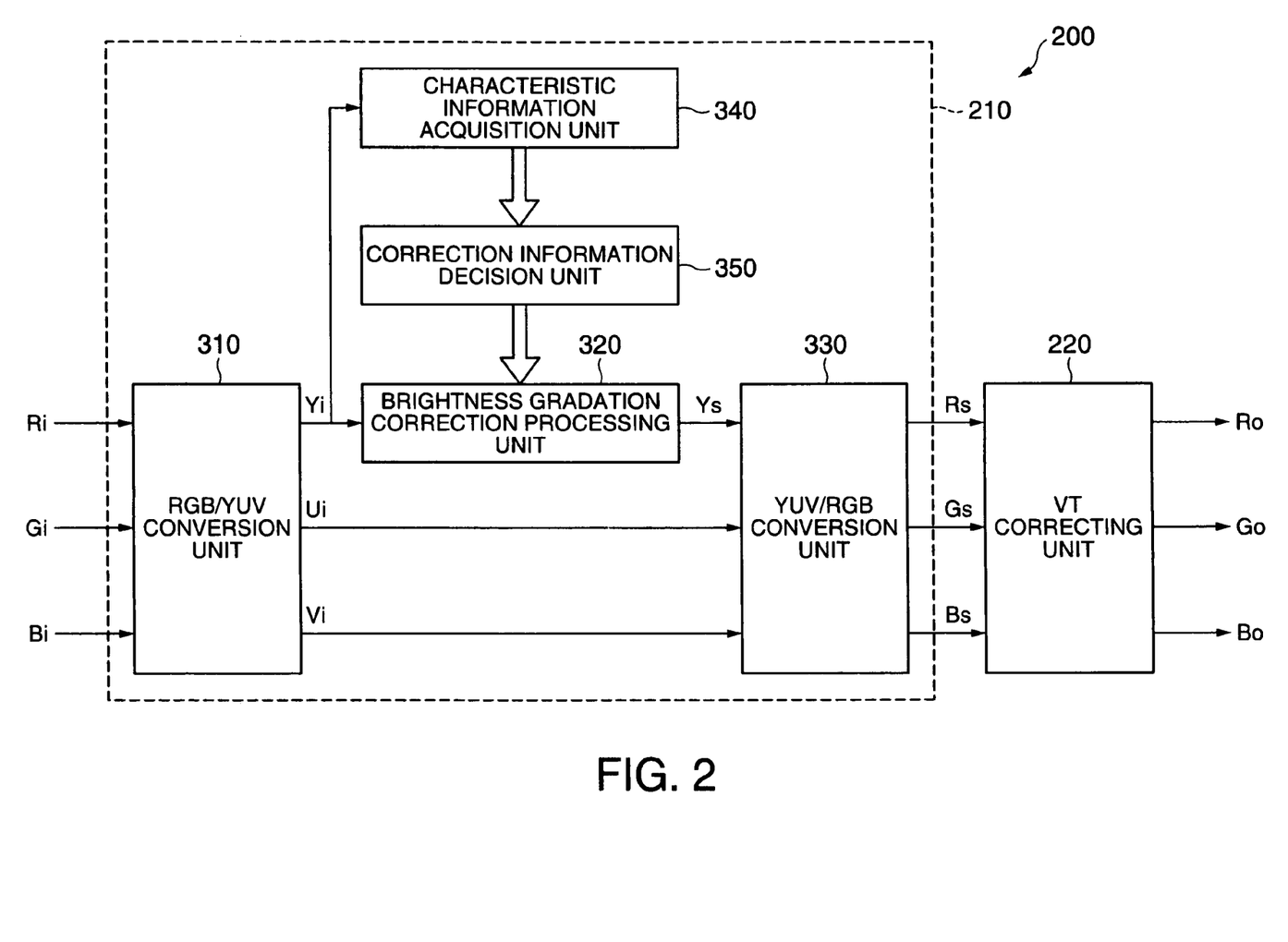
FIG. 2 is a schematic of a gradation correcting unit 200 in an exemplary embodiment.

The gradation correcting unit 200 corresponding to a gradation correcting device of the exemplary embodiments is described herein. FIG. 2 is a schematic of a structure of the gradation correcting unit 200. The gradation correcting unit 200 has a brightness gradation correcting unit 210 and a VT correcting unit 220. The brightness gradation correcting unit 210 corrects gradation attributes with respect to brightness of an image indicated by an inputted RBG signal (Ri, Gi, Bi), and outputs the corrected RGB signal (Rs, Gs, Bs) as will be described later. The VT correcting unit 220 corrects gradation attributes of the inputted RGB signal (Rs, Gs, Bs) so as to correct nonlinear input-output attributes, which are inherent in the liquid crystal panel 140, to linear input-output attributes, and then outputs the corrected RGB signal (Ro, Go, Bo). The input-output attributes of an image display system using CRT (Cathode Ray Tube) are typically represented by a gamma curve. Thus, input-output attributes of an image display system, other than the CRT image display system, are generally so established as to be expressed as a gamma curve in correspondence with the input-output attributes of the CRT image display system. Therefore, in the VT correcting unit 220, correction of the gradation attributes of the RGB signal (Ro, Go, Bo) outputted for the inputted RGB signal (Rs, Gs, Bs) are executed such that the input-output attributes of the image display system 10 can be represented by a gamma curve, as well as the correction of the nonlinear input-output attributes, which are inherent in the liquid crystal panel.

Hereinafter, the brightness gradation correcting unit 210, which is a characterized part of the exemplary embodiments, is described in more detail.

B1. Organization of Brightness Gradation Correcting Unit

The brightness gradation correcting unit 210 includes an RGB/YUV conversion unit 310, a brightness gradation correction processing unit 320, a YUV/RGB conversion unit 330, a characteristic information acquisition unit 340, and a correction information decision unit 350. Details of those units are explained below one by one.

B1.1. RGB/YUV Conversion Unit:

The RGB/YUV conversion unit 310 converts the signal type of an inputted digital image signal DIV. More specifically, the RGB/YUV conversion unit 310 converts an RGB signal (Ri, Gi, Bi) into a YUV signal (Yi, Ui, Vi). In the YUV signal, a brightness signal Yi is inputted to the brightness gradation correction processing unit 320 and the characteristic information acquisition unit 340. A structure required for converting the RGB signal into the YUV signal is known in the field of image processing, and is not particularly explained herein.

B1.2. Characteristic Information Acquisition Unit:

The characteristic information acquisition unit 340 acquires characteristic information showing characteristics of an image on each frame as characteristic parameters on the basis of the brightness signal Yi for a displayed image on one frame inputted as a unit. More specifically, the characteristic information acquisition unit 340 acquires as characteristic parameters three types of information of the minimum brightness, maximum brightness and average brightness of the brightness signal on one frame. The values of the acquired characteristic parameters are supplied to the correction information decision unit 350. A structure required for obtaining the minimum brightness, maximum brightness, and average brightness of the brightness signal from the inputted brightness signal Yi is known in the field of image processing, and is not particularly explained herein.

B1.3. Correction Information Decision Unit:

The correction information decision unit 350 determines values corresponding to correction parameters to be described later in accordance with the combinations of the three characteristic parameters for an image on each frame supplied as a unit from the characteristic information acquisition unit 340. The determined values of the correction parameters are supplied to the brightness gradation correction processing unit 320.

B1.4. Gradation Correction Processing Unit:

The brightness gradation correction processing unit 320 performs nonlinear arithmetic operation for the input brightness signal Yi, and outputs a brightness signal Ys after the nonlinear arithmetic operation. The attributes of the nonlinear arithmetic operation are established in accordance with the correction parameters supplied from the correction information decision unit 350. The nonlinear arithmetic operation in the brightness gradation correction processing unit 320 is performed in accordance with the supply timing of the correction parameters from the correction information decision unit 350.

The brightness signal Ys, after correction, is inputted to the YUV/RGB conversion unit 330 together with two color-difference signals Ui and Vi, outputted from the RGB/YUV conversion unit 310.

The nonlinear arithmetic operation performed in the brightness gradation correction processing unit 320 will be described below.

B1.5. YUV/RGB Conversion Unit:

The YUV/RGB conversion unit 330 converts the signal type of an inputted digital image signal similarly to the RGB/YUV conversion unit 310. More specifically, the YUV/RGB conversion unit 330 converts the YUV signal Ys, Ui, Vi into the RGB signal Rs, Gs, Vs. The RGB signal Rs, Gs, Bs, after conversion, is inputted to the VT correcting unit 220. A structure required to convert the YUV signal into the RGB signal is also known in the field of image processing, and is not particularly explained herein.

The brightness gradation correcting unit 210 may be formed by a processor capable of processing image signals on one frame as a unit at high speed. In particular, the brightness gradation correction processing unit 320 may be formed by a processor capable of performing high-speed nonlinear arithmetic operation for image signals on one frame as a unit.

B2. Setting of Brightness Gradation Attributions

Setting of attributions of nonlinear arithmetic operation performed in the brightness gradation correction processing unit 320 will now be described, i.e., setting of gradation attributes of the output brightness signal Ys for the input brightness signal Yi.

Figure 3:
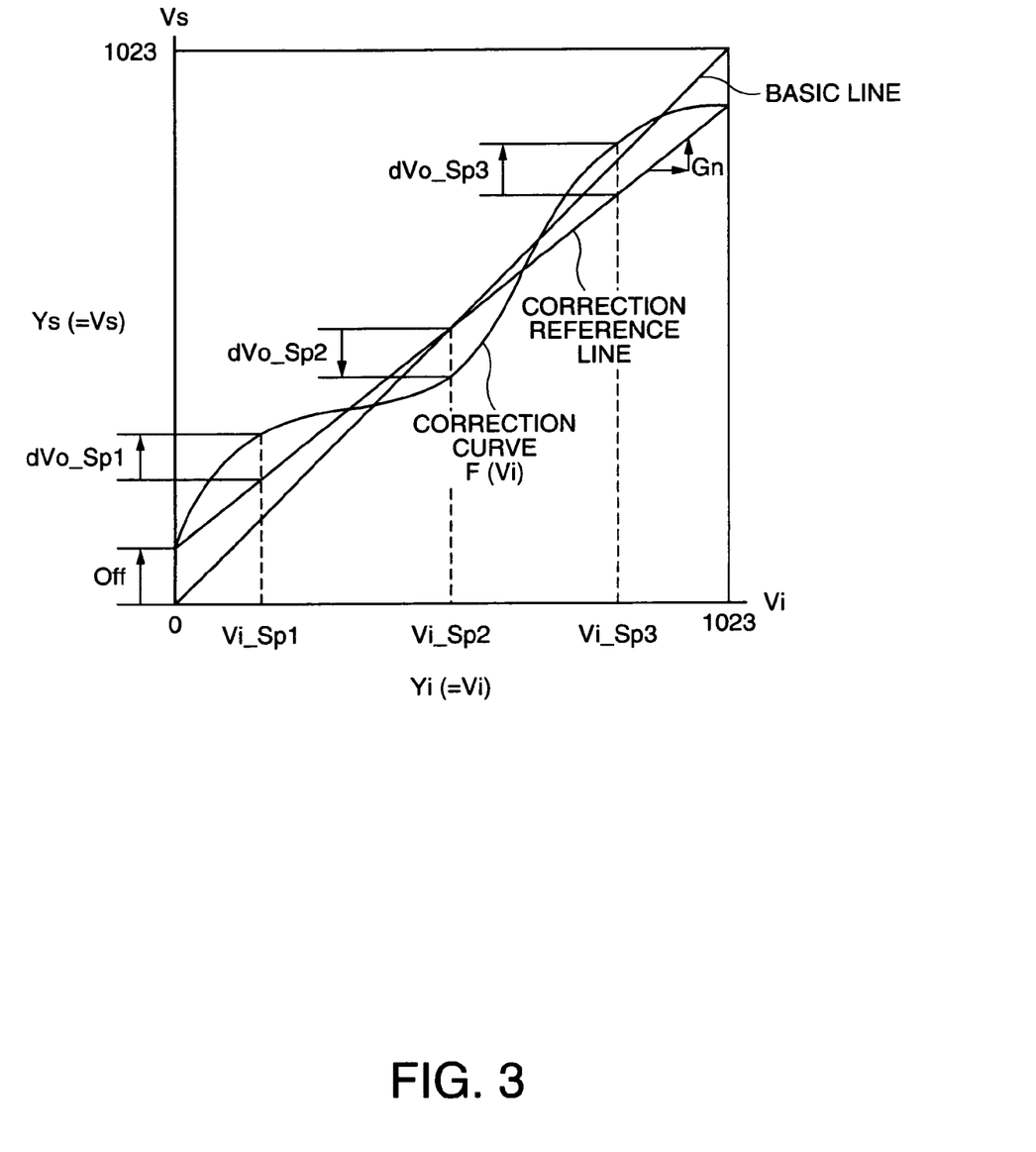
FIG. 3 is chart of a function F (Yi) used for non-linear arithmetic operation performed in a brightness gradation correction processing unit 320 in an exemplary embodiment.

B2.1 Function of Nonlinear Arithmetic Operation:

FIG. 3 is a schematic of a function F (Yi) used for the nonlinear arithmetic operation performed in the brightness gradation correction processing unit 320. The function F (Yi) employed in this unit is a spline function. The input-output attributes of a signal represented by the spline function F (Yi) are determined by eight correction parameters of an offset Off, a gain Gn, first through third curve set positions Vi_SP1 through Vi_SP3, and first through third curve set values dVi_SP1 through dVi_SP3 corresponding to the respective set positions. The first through third curve set values dVi_SP1 through dVi_SP3 are expressed in terms of displacement from a correction reference line, to be described below. The attributes of the curve Ys=F (Yi) (hereinafter also refereed to as "correction curve"), defined by the spline function F (Yi), correspond to the gradation attributes of the output brightness signal Ys for the input brightness signal Yi in the brightness gradation correction processing unit 320.

As illustrated in FIG. 3, a basic line is a line on which a brightness Vi of the input brightness signal Yi is equal to a brightness Vs of the output brightness signal. On the other hand, a line as a reference for correction (hereinafter also referred to as "correction reference line") is established by the offset Off showing displacement of the brightness Vs from the basic line at Vi=0 and the gain Gn showing an inclination of the brightness Vs relative to the brightness Vi. The two end points of the correction reference line correspond to the two end points of the correction curve.

Thereafter, the attributes of the spline function F (Yi) are established such that the two end points of the correction curve and the three points on the correction curve, which are determined by the first through third curve set positions Vi_SP1 through Vi_SP3 and the first through third curve set values dVi_SP1 through dVi_SP3 corresponding to the respective set positions, are connected by a smooth curve. Thus, the gradation attributes of the output brightness signal Ys for the input brightness signal Yi, in the brightness gradation correction processing unit 320, can be represented by the correction curve of Ys=F (Yi), defined by the spline function F (Yi).

B2.2 Determination of Correction Parameters:

The correction information decision unit 350 determines the above-described eight correction parameters according to the combinations of the three characteristic parameters (the minimum brightness, average brightness and maximum brightness) supplied from the characteristic information acquisition unit 340.

The correction information decision unit 350 has a correction parameter table which shows the combinations of the above-described three characteristic parameters and the above-described corresponding eight correction parameters in association therewith. This correction parameter table is stored in a memory included in the correction information decision unit 350 or a memory (not-shown) included anywhere within the image display system 10, so as to be accessible for reference.

Figure 4:
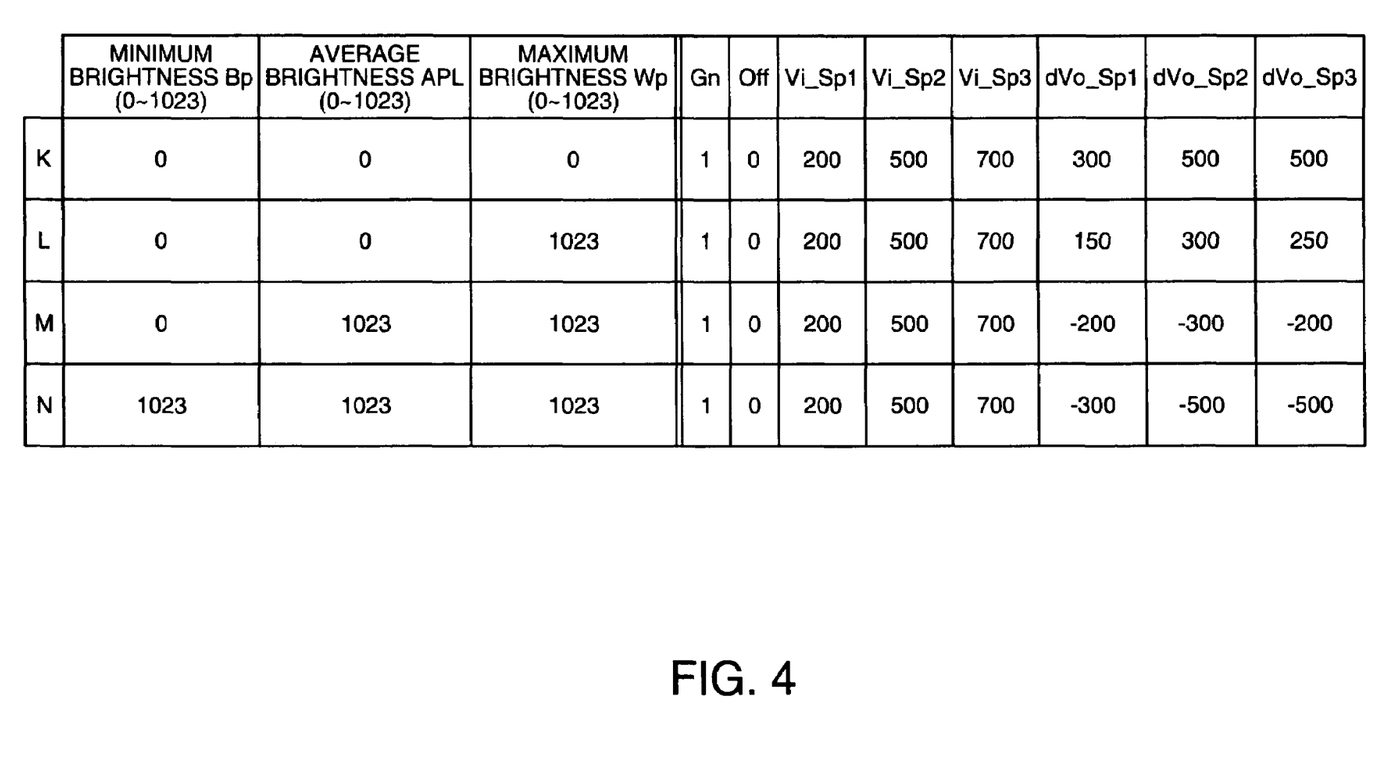
FIG. 4 is a correction parameter table in an exemplary embodiment.

FIG. 4 is a schematic of the correction parameter table. In the correction parameter table, values of eight correction parameters are associated with each of four combinations of K, L, M, and N in various combinations of a minimum brightness Bp, an average brightness APL, and a maximum brightness Wp. It is assumed that each of the minimum brightness Bp, the average brightness APL and the maximum brightness Wp is a gradation value with 10 bits in a range from the lowest brightness (0) to the highest brightness (1023).

The combination K is a combination of Bp=0, APL=0, and Wp=0. The combination L is a combination of Bp=0, APL=0, and Wp=1023. The combination M is a combination of Bp=0, APL=1023, and Wp=1023. The combination N is a combination of Bp=1023, APL=1023, and Wp=1023.

The correction information decision unit 350 determines values of the eight correction parameters corresponding to the combinations of the three characteristic parameters supplied from the characteristic information acquisition unit 340, by referring to the correction parameter table.

For a combination of the characteristic parameters which is not included in the correction parameter table, the values of the correction parameters corresponding to this combination are determined by an interpolating calculation described below.

Figure 5:
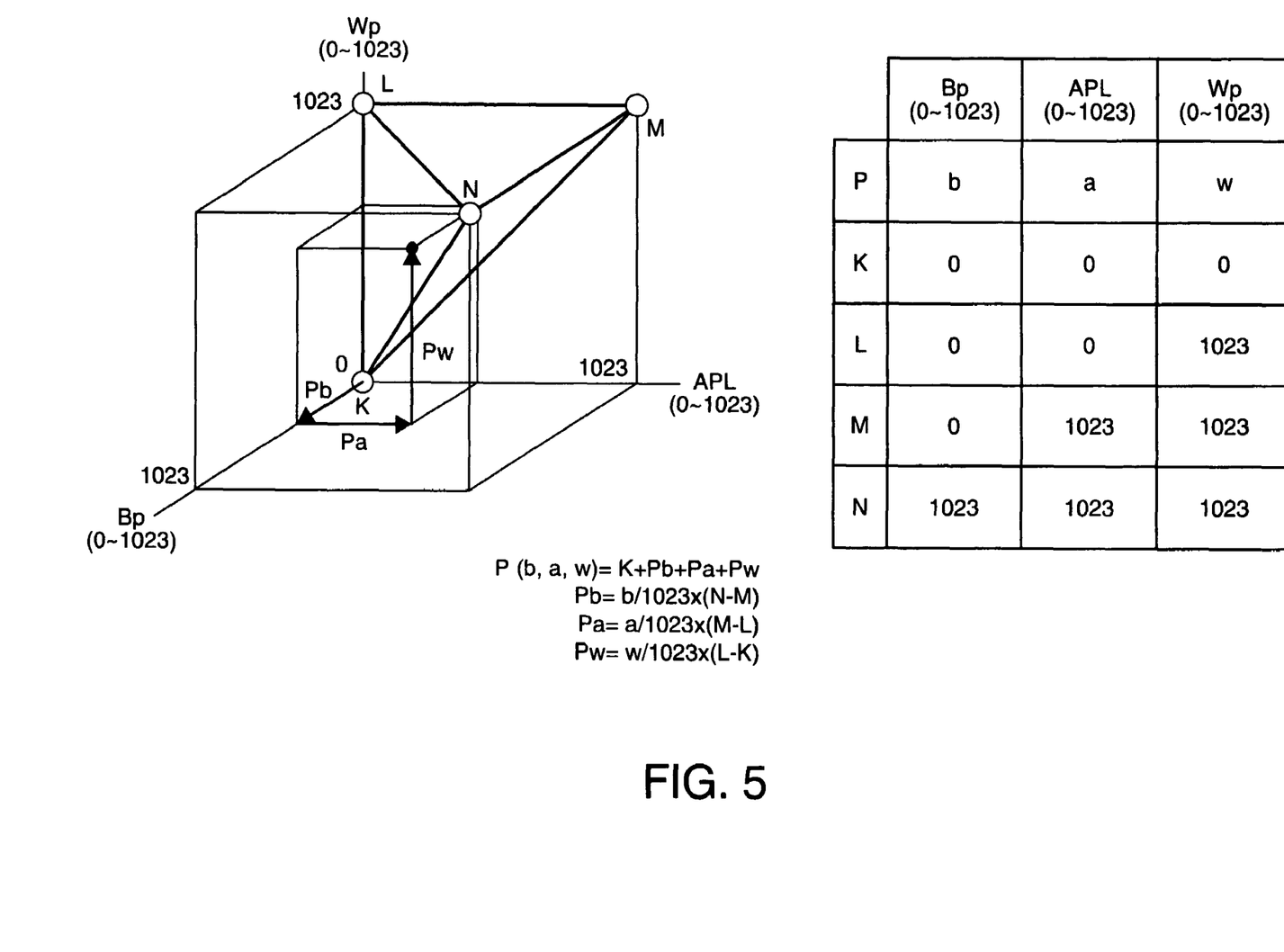
FIG. 5 is a schematic of interpolating calculation of correction parameters in an exemplary embodiment.

FIG. 5 is a schematic showing the interpolating calculation of the correction parameters. As illustrated in FIG. 5, the combinations of the minimum brightness Bp, the average brightness APL, and the maximum brightness Wp are indicated by points (positions) on a three-dimensional coordinate system formed by coordinate axes of the minimum brightness Bp, the average brightness APL, and the maximum brightness Wp crossing one another at right angles. All points of possible combinations of the minimum brightness Bp, the average brightness APL and the maximum brightness Wp are contained within a tetrahedron KLMN having vertexes of four points K(0, 0,0), L(0, 0, 1023), M(0, 1023, 1023) and N(1023, 1023, 1023). The four points are shown in the table of FIG. 5 and correspond to the four combinations K, L, M and N shown in the correction parameter table of FIG. 4.

Each correction parameter of a point P within the tetrahedron KLMN, which has b ($0 \leq b \leq 1023$) as the minimum brightness Bp, a ($0 \leq a \leq 1023$) as the average brightness APL, and w ($0 \leq w \leq 1023$) as the maximum brightness Wp, can be obtained using an interpolating calculation formula shown below for calculating the position of the point P from the four points K, L, M and N by linear interpolation.

The position of the point P (b, a, w) is obtained from a displacement Pb of the minimum brightness Bp, a displacement Pa of the average brightness APL, and a displacement Pw of the maximum brightness Wp with respect to the point K using the interpolating calculation formula shown by the following equation (1):

$$P(b, a, w) = K + Pb + Pa + Pw \quad (1)$$

In an exemplary embodiment, the displacement Pb of the minimum brightness Bp increases from the brightness at the point M to the brightness at the point N, i.e., by a value corresponding to (N−M) when the value of the minimum brightness Bp increases from the lowest brightness (0) to the highest brightness (1023). Thus, the displacement Pb, of the minimum brightness Bp when the value of the minimum brightness Bp increases from the lowest brightness (0) at the point K to the brightness (b) at the point P, is calculated from the following equation (2):

$$Pb = b/1023 \times (N-M) \qquad (2)$$

In an exemplary embodiment, the displacement Pa of the average brightness APL increases from the brightness at the point L to the brightness at the point M, i.e., by a value corresponding to (M−L) when the value of the average brightness APL increases from the lowest brightness (0) to the highest brightness (1023). Thus, the displacement Pa, of the average brightness APL when the value of the average brightness APL increases from the lowest brightness (0) at the point K to the brightness (a) at the point P, is calculated from the following equation (3):

$$Pa = a/1023 \times (M-L) \qquad (3)$$

In an exemplary embodiment, the displacement Pw of the maximum brightness Wp increases from the brightness at the point K to the brightness at the point L, i.e., by a value corresponding to (L−K) when the value of the maximum brightness Wp increases from the lowest brightness (0) to the highest brightness (1023). Thus, the displacement Pw, of the maximum brightness Wp when the value of the maximum brightness Wp increases from the lowest brightness (0) to the brightness (w) at the point P, is calculated from the following equation (4):

$$Pw = w/1023 \times (L-K) \qquad (4)$$

When respective correction parameters are practically calculated using the above equations (1) through (4), K, L, M, N and P are replaced with the correction parameters to be calculated.

Hereinafter, the following is described: (1) an example of a combination P1 (Bp=100, APL=200, Wp=700) (Interpolating Calculation Example 1); and (2) an example of a combination P2 (Bp=500, APL=700, Wp=900) (Interpolating Calculation Example 2) for the interpolating calculations using the above equations (1) through (4).

(1) INTERPOLATING CALCULATION EXAMPLE 1

First through third curve set values dVo_SP1 through dVo_SP3 in the combination P1 (Bp=100, APL=200, Wp=700) are obtained by the interpolating calculation using the above equations (1) through (4), as shown in the following equations (5a) through (5c):

$$dVo\_SP1 = 300 + 100/1023 \times (-300-(-200)) + 200/1023 \times (-200-150) + 700/1023 \times (150-300) = 119 \qquad (5a)$$

$$dVo\_SP2 = 500 + 100/1023 \times (-500-(-300)) + 200/1023 \times (-300-300) + 700/1023 \times (300-500) = 226 \qquad (5b)$$

$$dVo\_SP3 = 500 + 100/1023 \times (-500-(-200)) + 200/1023 \times (-200-250) + 700/1023 \times (250-500) = 212 \qquad (5c)$$

As is obvious from the correction parameter table in FIG. 4, the first through third curve set positions Vi_SP1 through Vi_SP3, the gain Gn, and the offset Off, are all fixed values and do not require interpolating calculation. Thus, the explanation of the interpolating calculation for those is herein omitted. The same is true for Interpolating Calculation Example 2.

(2) INTERPOLATING CALCULATION EXAMPLE 2

First through third curve set values dVo_SP1 through dVo_SP3 in the combination P2 (Bp=500, APL=700, Wp=900) are also obtained by the interpolating calculation using the above equations (1) through (4), as shown in the following equations (6a) through (6c):

$$dVo\_SP1 = 300 + 500/1023 \times (-300-(-200)) + 700/1023 \times (-200-150) + 900/1023 \times (150-300) = -120 \qquad (6a)$$

$$dVo\_SP2 = 500 + 500/1023 \times (-500-(-300)) + 700/1023 \times (-300-300) + 900/1023 \times (300-500) = -184 \qquad (6b)$$

$$dVo\_SP3 = 500 + 500/1023 \times (-500-(-200)) + 700/1023 \times (-200-250) + 900/1023 \times (250-500) = -174 \qquad (6c)$$

B2.3 Example Setting Of Brightness Gradation Attributions

When the combination of the characteristic parameters is included in the correction parameter table, the values of the correction parameters obtained by reference to the correction parameter table are supplied to the brightness gradation correction processing unit 320. In the brightness gradation correction processing unit 320, the input-output attributes of the signal represented by the above-described spline function F (Yi) are established in accordance with the correction parameters thus supplied. Thus, the gradation attributes of the output brightness signal Ys for the input brightness signal Yi are established.

Figure 6:
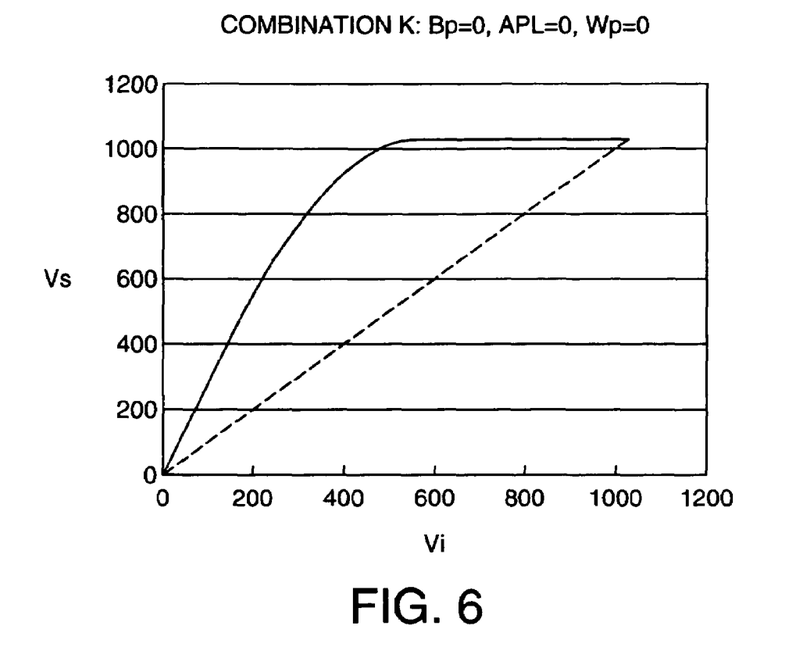
FIG. 6 is a chart of gradation attributes set for a combination K (Bp=0, APL=0, Wp=0) in an exemplary embodiment.

FIG. 6 is a chart of gradation attributes set for the combination K (Bp=0, APL=0, Wp=0). Since all values of the minimum brightness Bp, the average brightness APL and the maximum brightness Wp are the lowest brightness (0), in possible brightness values in the combination K, the entire image is totally dark. Thus, the gradation attributes in this case are set by a correction curve which places an emphasis only on the low-brightness gradation, i.e., the dark gradation while destroying the high-brightness gradation, i.e., the bright gradation.

Figure 7:
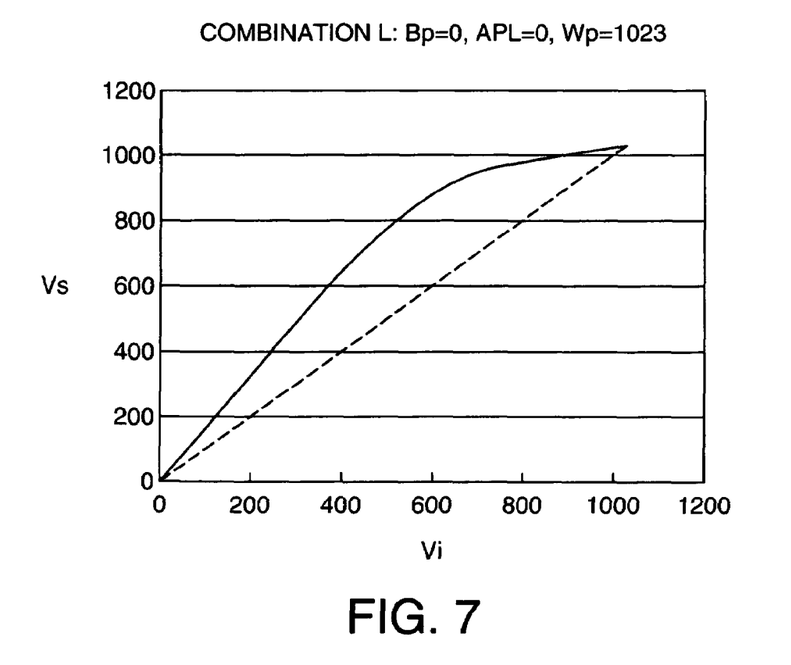
FIG. 7 is a chart of gradation attributes set for a combination L (Bp=0, APL=0, Wp=1023) in an exemplary embodiment.

FIG. 7 is a chart of gradation attributes set for the combination L (Bp=0, APL=0, Wp=1023). In the examples of setting differences of the gradation attributes described below, a curve shown by a solid line indicates gradation attributes, while a straight line shown by a broken line indicates a correction reference line. Since the average brightness APL is the lowest brightness (0) in the combination L, the entire image is almost dark. However, since the maximum brightness Wp is the highest brightness (1023) in possible brightness values, there is a bright portion having the maximum brightness only partially in the image. Thus, the gradation attributes in this case are set by a correction curve which places an emphasis on the low-brightness gradation, i.e., the dark gradation without destroying the high-brightness gradation, i.e., the bright gradation.

Figure 8:
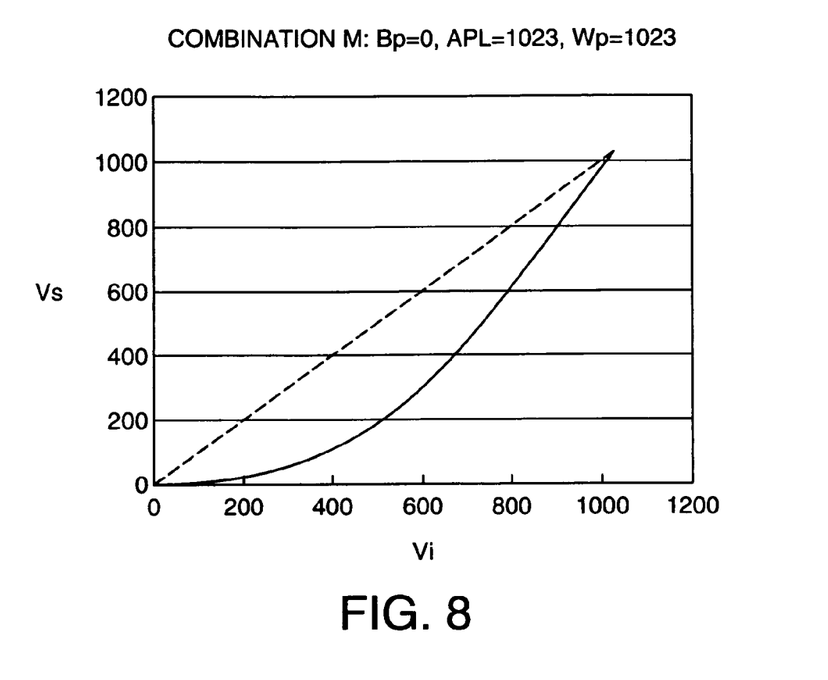
FIG. 8 is a chart of gradation attributes set for a combination M (Bp=0, APL=1023, Wp=1023) in an exemplary embodiment.

FIG. 8 is a chart of gradation attributes set for the combination M (Bp=0, APL=1023, Wp=1023). Since the average brightness APL is the highest brightness (1023) in the combination M, the entire image is the brightest. However, since the minimum brightness Bp is the lowest brightness (0) in possible brightness values, there is a totally dark portion having the minimum brightness only partially in the image. Thus, the gradation attributes in this case are set by a correction curve which places an emphasis on the high-brightness gradation, i.e., the bright gradation without destroying the low-brightness gradation, i.e., the dark gradation.

Figure 9:
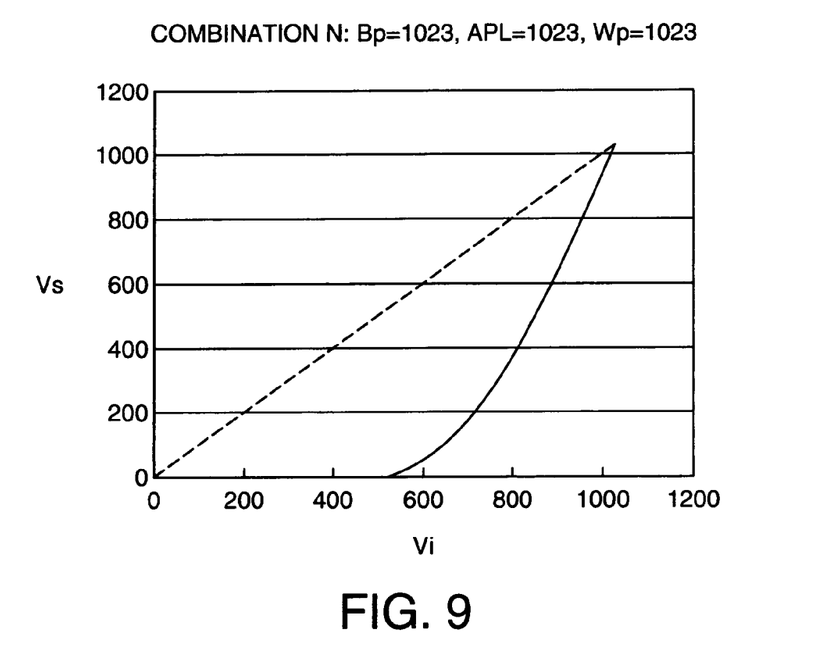
FIG. 9 is a chart of gradation attributes set for a combination N (Bp=1023, APL=1023, Wp=1023) in an exemplary embodiment.

FIG. 9 is a chart of gradation attributes set for the combination N (Bp=1023, APL=1023, Wp=1023). Since all values of the minimum brightness Bp, the average brightness APL and the maximum brightness Wp are the highest brightness (1023) in the combination N, the entire image is the brightest. Thus, the gradation attributes in this case are set by a correction curve which places an emphasis only on the high-brightness gradation, i.e., the bright gradation while destroying the low-brightness gradation, i.e., the dark gradation.

When the combination of the characteristic parameters is not included in the correction parameter table, the values of the correction parameters corresponding to the combination are obtained by the interpolating calculation and supplied to the brightness gradation correction processing unit 320. In the brightness gradation correction processing unit 320, the attributes of the above-described spline function F (Yi) are established in accordance with the correction parameters thus supplied. Thus, the gradation attributes of the output brightness signal Ys for the input brightness signal Yi are established.

Figure 10:
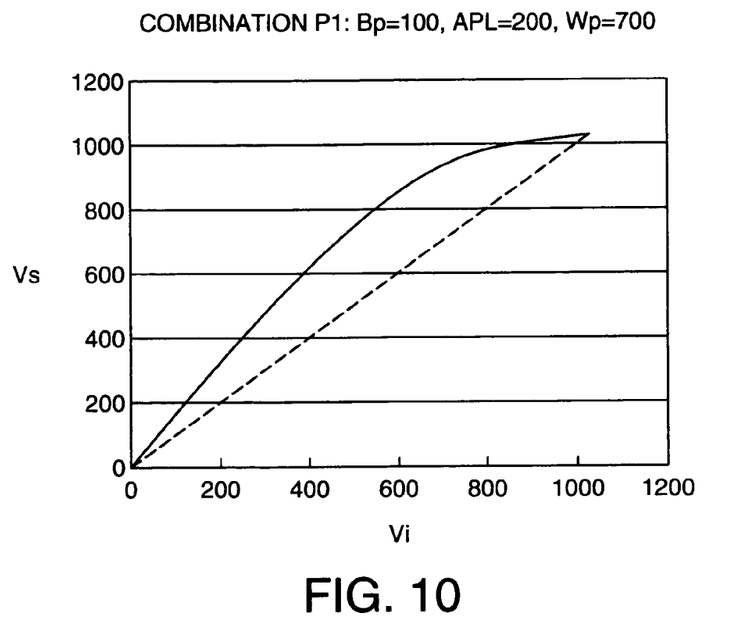
FIG. 10 is a chart of gradation attributes set for a combination P1 (Bp=100, APL=200, Wp=700) in an exemplary embodiment.

FIG. 10 is a chart of gradation attributes set for the combination P1 (Bp=100, APL=200, Wp=700). Since the combination P1 is not included in the correction parameter table shown in FIG. 4, the respective correction parameters are obtained by the interpolating calculation shown by the equations (5a) through (5c).

Since the value of the average brightness APL is an intermediate value (200) between an intermediate brightness (512) in possible brightness values and the lowest brightness (0) in the combination P1, the entire image is rather dark. However, since the maximum brightness Wp is an intermediate value (700) between the intermediate brightness (512) and the highest brightness (1023), there is a relatively bright portion in the image. Thus, considering that the minimum brightness Wp is the intermediate value (100) between the average brightness APL (200) and the lowest brightness (0), and that the maximum brightness Wp is the intermediate value (700) between the intermediate brightness (512) and the highest brightness (1023), as shown in FIG. 10, the gradation attributes in this case are set by a correction curve which places an emphasis on the low-brightness gradation attributes and the gradation attributes from the minimum brightness Bp to the maximum brightness Wp, without destroying the bright gradation.

Figure 11:
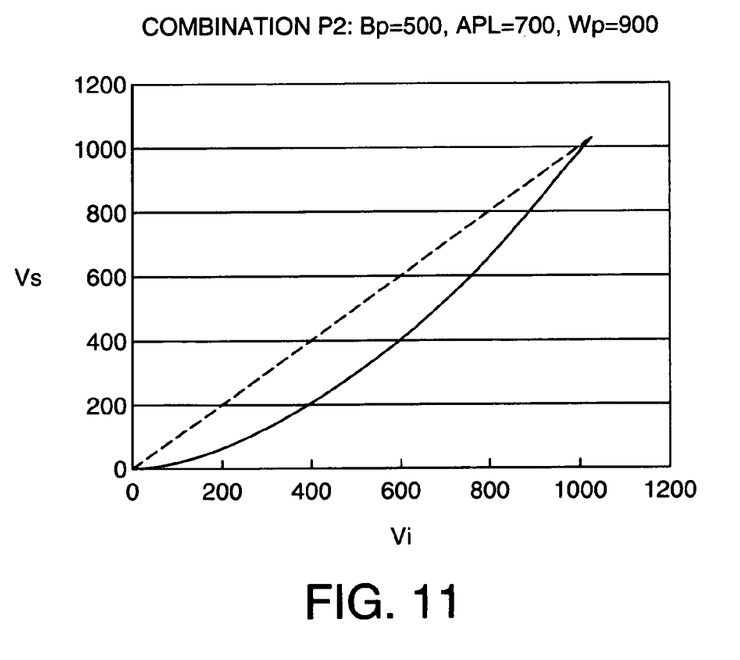
FIG. 11 is a chart of gradation attributes set for a combination P2 (Bp=500, APL=700, Wp=900) in an exemplary embodiment.

FIG. 11 is a chart of gradation attributes set for the combination P2 (Bp=500, APL=700, Wp=900). Since the combination P2 is not included in the correction parameter table shown in FIG. 4, either, the respective parameters are obtained by the interpolating calculation shown by the equations (6a) through (6c).

Since the value of the average brightness APL is an intermediate value (900) between the intermediate brightness (512) and the highest brightness (1023) in the combination P2, and the minimum brightness Bp is close to the intermediate brightness, the image is bright as a whole without including a portion having low brightness. Thus, as shown in FIG. 11, the gradation attributes in this case are set by a correction curve which places an emphasis on the high-brightness gradation attributes and the gradation attributes from the minimum brightness Bp to the maximum brightness Wp without destroying the dark side gradation.

B3. Advantages

Accordingly, in the brightness gradation correction unit 210 of this exemplary embodiment, the gradation attributes indicated by the output brightness signal Ys, for the input brightness signal Yi, in the brightness gradation correction processing unit 320, are established in accordance with the combinations of the three characteristic parameters of the minimum brightness, the average brightness, and the maximum brightness acquired for one frame as a unit. Thus, the bright gradation attributes can be set considering not only the average brightness and the maximum brightness but also the minimum brightness. Also, the dark gradation attributes can be set considering not only the average brightness and the minimum brightness but also the maximum brightness. Accordingly, gradation attributes with respect to brightness of a displayed image can be more appropriately established in accordance with characteristics of the displayed image than in a related-art technique.

Additionally, since gradation attributes with respect to brightness are represented by a correction curve which is defined by a spline function established by a plurality of correction parameters, variations in gradation attributes can be expressed as a smooth curve. Thus, for example, deterioration of image quality and the like due to damage to an image caused at a boundary where gradation attributes vary, such as non-continuation of gradation attributes, can be reduced or prevented.

Moreover, since the offset Off and the gain Gn corresponding to the two end points of the correction curve, the spline function F (Yi) can be easily established. That is, the spline function F (Yi) can be easily established when the first through third curve set positions Vi_SP1 through Vi_SP3, corresponding to the three points on the correction curve, and the first through third curve set values dVi_SP1 through dVi_SP3, corresponding to the respective curve set positions, are used as a plurality of correction parameters as described above.

C. Modifications

The exemplary embodiments are not limited to the particular embodiments and examples described herein, but rather, the exemplary embodiments will include other various embodiments falling within the scope and spirit of the exemplary embodiments described herein. For example, the following modifications are allowable.

C1. Modification 1:

In the above exemplary embodiment, the eight correction parameters are associated with each of the four combinations of the three characteristic parameters (corresponding to the vertexes K, L, M and N of the tetrahedron KLMN shown in FIG. 5) in the correction parameter table shown in FIG. 4, for convenience of explanation. However, it is possible, for example, to use a correction parameter table in which eight correction parameters are associated with each combination of a plurality of characteristic parameters corresponding to a plurality of positions within the tetrahedron KLMN in addition to the four combinations shown in FIG. 4. In this case, for a combination of the three characteristic parameters not included in the correction parameter table, eight correction parameters for this combination can be obtained by the interpolating calculation in the same manner as in the above exemplary embodiment. Additionally, the respective values of the correction parameters are not fixed values, and the user may arbitrarily set those in advance.

C2. Modification 2:

In the above exemplary embodiment, the three points on the correction curve defined by the spline function F (Yi) are determined by the six correction parameters of the three curve set positions Vi_SP1 through Vi_SP3 and the curve set values dVo_SP1 through dVo_SP3 corresponding to the respective set positions. However, a plurality of points on the correction curve defined by the spline function F(Yi) may be specified by correction parameters of two or more curve set positions and curve set values corresponding to the respective curve set positions.

C3. Modification 3:

In the above exemplary embodiment, the attributes of the spline function F (Yi) are established by eight correction parameters of the gain Gn, the offset Off, the three curve set positions Vi_SP1 through Vi_SP3, and the curve set values dVo_SP1 through dVo_SP3 corresponding to the respective set positions. However, inclinations of respective tangential lines at the two end points of the correction curve obtained from the gain Gn and the offset Off may be added to the parameters, for example. That is, any parameters may be employed as long as they can appropriately establish the attributes of the spline function F (Yi).

C4. Modification 4:

In the above exemplary embodiment, the two end points of the correction curve are obtained by using the gain Gn and the offset Off as correction parameters. However, set positions of the two end points and set values and inclinations of tangential lines corresponding to the respective set positions may be directly employed as correction parameters.

C5. Modification 5:

In the above exemplary embodiment, the gain Gn, the offset Off, and the three curve set positions Vi_SP1 through Vi_SP3 in the eight correction parameters, are each fixed values for convenience of explanation. However, those values may be varied in accordance with the combinations of the minimum brightness, average brightness and maximum brightness. More specifically, the values of the correction parameters used to determine the attributes of the spline function may be appropriately varied in accordance with the combinations of the minimum brightness, average brightness, and maximum brightness.

C6. Modification 6:

In the above exemplary embodiment, the spline function is employed as the function F (Yi) used for the non-linear arithmetic operation. However, various polynomial functions may be employed to connect a plurality of points on a correction curve defined by correction parameters using a smooth curve. Alternatively, a plurality of points on a correction curve established according to parameters may be connected using a straight line. However, in an exemplary embodiment, a plurality of points are connected on a correction curve defined by correction parameters using a smooth curve, and damage to images caused at a boundary where gradation attributes vary are considered.

C7. Modification 7:

In the above exemplary embodiment, the signal type of the image signals inputted to the input processing unit 110 is the RGB signal type. However, the signal type of the image signals may be other signal types such as YUV type. When YUV type image signals are used, the RGB/YUV conversion unit 310, included in the brightness gradation correcting unit 210 of the gradation correcting unit 200, can be eliminated.

C8. Modification 8:

In the above exemplary embodiment, the respective blocks included in the gradation correcting unit 200 are provided as hardware components. However, the functions of the respective blocks, particularly the function of the brightness gradation correcting unit 210 may be performed by software which uses a computer for reading and executing programs. Alternatively, the hardware and the software may be combined to perform the functions.

C9. Modification 9:

In the above exemplary embodiment, the technique of the exemplary embodiments is applied to a projector using a liquid crystal panel as a non-emission type display device. However, the exemplary embodiments are applicable to a projector using a DMD (Digital Micromirror Device) as a non-emission type display device, for example. FurthermDevore, the exemplary embodiments may be applied not only to a projector, but also to a direct-viewing image display system. Additionally, the exemplary embodiments may be applied to an image display system using various emission-type display devices such as CRT (Cathode Ray Tube), PDP (Plasma Display Panel) and FED (Field Emission Display).

What is claimed is:

1. A gradation attributes correcting device to correct gradation attributes of an input image signal for creating an output image on a frame, comprising:
    a brightness gradation correcting unit to correct gradation attributes with respect to brightness of the output image on the frame indicated by the input image signal, the brightness gradation correcting unit including:
        a characteristic information acquisition unit to acquire a minimum brightness, an average brightness and a maximum brightness of the output image on the frame from the input image signal;
        a correction information decision unit to determine correction information to correct the gradation attributes with respect to brightness according to a combination of the acquired minimum brightness, average brightness and maximum brightness of the output image on the frame; and
        a brightness gradation correction processing unit to establish a polynomial function for the output image on the frame based on the correction information to correct the gradation attributes of the input signal for creating the output image on the frame with respect to brightness by arithmetic operation using the polynomial function for the output image on the frame.

2. The gradation attributes correcting device according to claim 1, the polynomial function being a spline function.

3. The gradation attributes correcting device according to claim 1, the correction information at least including information on a correction reference line as a reference for the correction of the gradation attributes with respect to the brightness, and information on a correction curve based on corrected gradation attributes with respect to the brightness, the information on the correction curve including a plurality of curve set positions on the correction curve and respective displacement from the correction reference line at the plurality of curve set positions.

4. The gradation attributes correcting device according to claim 1, the correction information decision unit including a correction information table which shows correction information corresponding to the combinations of the minimum brightness, average brightness, and maximum brightness in association with a plurality of the combinations thereof, and which determines correction information corresponding to the combinations of the acquired minimum brightness, average brightness, and maximum brightness by referring to the correction information table.

5. The gradation attributes correcting device according to claim 4, the correction information decision unit determining correction information corresponding to the combinations of the acquired minimum brightness, average brightness, and maximum brightness by a predetermined interpolating arithmetic operation when the correction information corresponding to the combinations is not included in the correction information table.

6. The gradation attributes correcting device according to claim 1, further comprising:
a correction unit to correct nonlinear input-output attributes of an image signal outputted from the brightness gradation correcting unit, the nonlinear input-output attributes being in a display device included in an image display system.

7. A brightness gradation correcting method to correct gradation attributes with respect to brightness of an output image on a frame indicated by an input image signal for creating the output image on the frame, comprising:
acquiring the minimum brightness, average brightness and maximum brightness of the output image on the frame by the input image signal;
determining correction information to correct the gradation attributes with respect to brightness according to combinations of the acquired minimum brightness, average brightness and maximum brightness of the output image on the frame; and
establishing a polynomial function for the output image on the frame based on the correction information to correct the gradation attributes of the input signal for creating the output image on the frame with respect to brightness by arithmetic operation using the polynomial function for the output image on the frame.

8. A computer program, embodied on a computer readable medium, to correct gradation attributes with respect to brightness of an output image on a frame indicated by an image signal for creating the output image on the frame, the program comprising:
a program for acquiring minimum brightness, average brightness and maximum brightness of the output image on one frame by the input image signal;
a program for determining correction information for correcting the gradation attributes with respect to brightness according to combinations of the acquired minimum brightness, average brightness and maximum brightness of the output image on the frame; and
a program for establishing a polynomial function for the output image on the frame based on the correction information to correct the gradation attributes of the input signal for creating the output image on the frame with respect to brightness by arithmetic operation using the polynomial function for the output image on the frame.

* * * * *